(12) United States Patent
Jaber et al.

(10) Patent No.: US 8,793,478 B2
(45) Date of Patent: Jul. 29, 2014

(54) GRID COMPUTING RESOURCES AND A METHOD OF USE THEREOF

(75) Inventors: Muhammed K. Jaber, Austin, TX (US); Surender V. Brahmaroutu, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 1581 days.

(21) Appl. No.: 12/120,339

(22) Filed: May 14, 2008

(65) Prior Publication Data
US 2009/0287916 A1   Nov. 19, 2009

(51) Int. Cl.
G06F 15/177   (2006.01)

(52) U.S. Cl.
USPC .......................................................... 713/2

(58) Field of Classification Search
USPC .......................................................... 713/2
See application file for complete search history.

(56) References Cited

U.S. PATENT DOCUMENTS

| | | | |
|---|---|---|---|
| 5,995,928 A | 11/1999 | Nguyen et al. | |
| 6,009,455 A * | 12/1999 | Doyle | 709/201 |
| 6,791,547 B2 | 9/2004 | Thrasher | |
| 7,093,259 B2 | 8/2006 | Pulsipher et al. | |
| 7,114,127 B2 | 9/2006 | Weitzman | |
| 7,117,500 B2 | 10/2006 | Pulsipher et al. | |
| 7,159,217 B2 | 1/2007 | Pulsipher et al. | |
| 7,210,047 B2 | 4/2007 | Liebenow | |
| 7,231,504 B2 | 6/2007 | Kashyap et al. | |
| 7,240,227 B2 | 7/2007 | Maezawa | |
| 7,284,156 B2 | 10/2007 | Creamer et al. | |
| 7,299,229 B2 | 11/2007 | Doyle et al. | |
| 7,299,466 B2 | 11/2007 | Pulsipher et al. | |
| 7,325,040 B2 | 1/2008 | Truong | |
| 7,515,899 B1 * | 4/2009 | Carr et al. | 455/403 |
| 7,546,450 B2 * | 6/2009 | Danielsen | 713/2 |
| 7,574,707 B2 * | 8/2009 | Bozak et al. | 717/176 |
| 7,774,477 B2 * | 8/2010 | Zintel et al. | 709/227 |
| 7,881,316 B2 * | 2/2011 | Kaler | 370/401 |
| 8,051,180 B2 * | 11/2011 | Mazzaferri et al. | 709/227 |

* cited by examiner

Primary Examiner — Kim Huynh
Assistant Examiner — Eric Chang
(74) Attorney, Agent, or Firm — Larson Newman, LLP (57) ABSTRACT

A method of using an information handling system can include communicating accessibility of a resource to a grid system, powering down the information handling system, receiving a wake request from the grid system, booting the information handling system into a grid mode where the resource is accessible to the grid system. Machine-executable code for an information handling system can include a method for indicating that a resource in the information handling system is accessible to a grid system, communicating that the resource is accessible to the grid system, and placing the information handling system into a low power state. An information handling system can include a processor that can indicate that a resource is accessible to a grid system, communicate to the grid system that the resource is accessible, and place the information handling system into a low power state.

20 Claims, 4 Drawing Sheets

GRID COMPUTING RESOURCES AND A METHOD OF USE THEREOF

FIELD OF THE DISCLOSURE

This disclosure relates generally to information handling systems, and more particularly to using resources in information handling systems when in a grid computing mode.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

Grid computing is a method of increasing processing power by using available computing resources within a network environment. When a user is not using an information handling system that is coupled to a network, substantially all of the resources of the information handling system are recognized as being available to be used by a grid management system. The grid management system can use the computing resources of the information handling system as additional processing capacity to perform processing tasks as requested by the grid management system. When the user needs to use the information handling system, the tasks being executed for the grid management system are suspended, and the resources of the information handling system are returned to the user's control.

To initiate the process, an agent program can be loaded on the user's information handling system that performs a set of tasks that are requested by the grid management system. Then, when the information handling system becomes available, the grid management system supplies data over the network to the information handling system. The agent program processes the data and sends the results back to the grid management system over the network. The grid management system then sends new data for processing on the information handling system. This process often occurs within the user context (i.e. the user is logged in to the user's information handling system), and thus the agent program can access substantially all the resources of the information handling system, including storage devices (e.g., hard drives).

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, a wireless router, or another network communication device, or any other suitable device, and can vary in size, shape, performance, functionality, and price. An information handling system can also include a set of any of the foregoing devices. The information handling system can include memory (volatile (e.g. random access memory (RAM), etc.), nonvolatile (read only memory (ROM), flash memory, etc.), or any combination thereof), one or more processing resources, such as a central processing unit (CPU), hardware, firmware, or software control logic, or any combination thereof. Additional resources of the information handling system can include one or more storage devices, one or more communications ports for communicating with external devices, as well as various input and output (I/O) devices, such as a keyboard, a mouse, a video display, another suitable I/O device, or any combination thereof. The information handling system can also include one or more buses operable to transmit communications between the various hardware resources. Portions of an information handling system may themselves be considered information handling systems.

Portions of an information handling system, when referred to as a "device", a "module", or the like, may be configured as hardware, firmware, software, or any combination thereof. For example, a device or a module may be hardware. A non-limiting example of a device or a module implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-express card, a Personal Computer Memory Card International Association (PCMCIA) card, or other such expansion card), or a system (e.g., a motherboard, a system-on-a-chip (SoC), or a stand-alone device). Similarly, the device or module can be firmware (i.e., any software running on an embedded device, a Pentium class or PowerPC™ brand processor, or other such device) or software (i.e., any software capable of operating in the relevant environment). The device or module can also be a combination of any of the foregoing examples of hardware, firmware, or software. Note that an information handling system can include an integrated circuit or a board-level product having portions thereof that can also be any combination of hardware or software.

Devices or programs that are in communication with one another need not be in continuous communication with each other, unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and, involve two or more network elements. For example, a communicative interaction may be "a conversation," or series of related communications between a client and a server—each network element sending and receiving information to and from the other. Whatever form the communicative interaction takes, the network elements involved need not take any specific form. A network element may be a node, a piece of hardware, software, firmware, middleware, another component of a computing system, or any combination thereof.

In the description below, a flow-charted technique may be described in a series of sequential actions. The sequence of the actions, and the party performing the steps may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features, but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

An information handling system, and method of using it are described below. An exemplary, non-limiting system description is described before addressing methods of using it. Some of the functionality of modules within the system is described with the system. The utility of the system and its modules will become more apparent with the description of the methods that follow the description of the system and modules.

Figure 1:
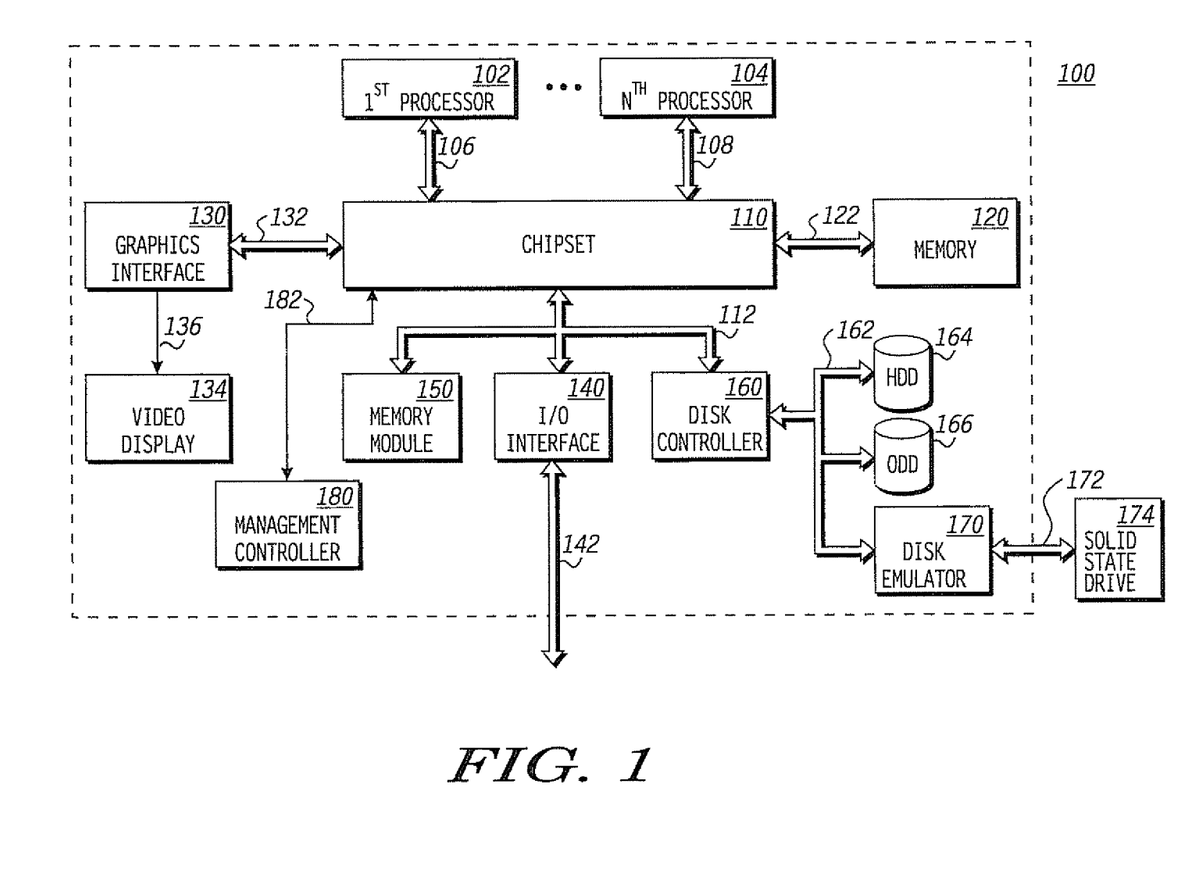
FIG. 1 illustrates a functional block diagram of an information handling system.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106. Further, the $n^{th}$ processor 104 can be coupled to the chipset 110 via the host bus 108. The chipset 110 can support the processors 102 through 104, and can allow for simultaneous processing of the processors 102 through 104, and support the exchange of information within the information handling system 100 during multiple processing operations. In an aspect, the chipset 110 can function to provide access to the processor 102 using host bus 106, and the $n^{th}$ processor 104 using the host bus 108. In another aspect, the chipset 110 can include a dedicated bus to transfer data between the processor 102 and the $n^{th}$ processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus. The chipset 110 can also provide bus control and can handle transfers between the host buses 106 through 108, and the memory bus 122. In accordance with another aspect, the chipset 110 can be generally considered an application specific chipset that provides connectivity to various buses, and integrates other system functions. For example, the chipset 110 can be provided using a chipset that includes two parts; a Graphics and Memory Controller Hub (GMCH) and an I/O Controller Hub (ICH). The chipset 110 can also be packaged as an ASIC.

The information handling system 100 can also include a graphics interface 130 that can be coupled to the chipset 110 using the graphics bus 132. The graphics interface 130 can provide a video display output 136 to the video display 134. In one form, the graphics interface 130 can be an Accelerated Graphics Port (AGP) interface to display content within a video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O interface 140 that can be connected via an I/O bus 112 to the chipset 110. The I/O bus 112 and the I/O interface 140 can include industry standard buses or proprietary buses, and respective interfaces or controllers. The I/O interface 140 includes an I/O channel 142. The I/O channel 142 can be coupled to an external resource (not illustrated). The external resource can include another information handling system, a data storage system, an external networking capability, a grid management system, another suitable function or any combination thereof. The I/O channel 142 can be of industry standard architecture (e.g., InfiniBand, Fibre Channel, Gb Ethernet, etc.), proprietary channel architecture, or any combination thereof. Other I/O channels (not illustrated) may also be used in addition to the I/O channel 142, if needed or desired.

The I/O bus 112 can also include a Peripheral Component Interconnect (PCI) bus or a high speed PCI-Express bus. In one embodiment, a PCI bus can be operated at approximately 66 MHz, and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 112, including other industry standard buses (e.g., Industry Standard Architecture (ISA), Small Computer Serial Interface (SCSI), Inter-Integrated Circuit (I$^2$C), System Packet Interface (SPI), or Universal Serial Bus (USB) or proprietary buses.

In an alternate embodiment, the chipset 110 can be a chipset employing a Northbridge/Southbridge chipset configuration (not illustrated). For example, a Northbridge portion of the chipset 110 can communicate with the processors 102 through 104 using the host buses 106 through 108, and can control interaction with the memory 120, the I/O bus 112, and activities for the video graphics interface 130. The chipset 110 can also include a Southbridge portion (not illustrated) of the chipset 110, and can handle I/O functions of the chipset 110. The Southbridge portion can manage basic forms of I/O, such as USB, serial I/O, audio outputs, Integrated Drive Electronics (IDE), ISA I/O, or any combination thereof for the information handling system 100.

The information handling system 100 can further include a disk controller 160 coupled to the I/O bus 112. The disk controller 160 can include a disk interface 162 that can include other industry standard buses (e.g., Integrated Drive Electronics (IDE), Parallel Advanced Technology Attachment (PATA), Serial Advanced Technology Attachment (SATA), SCSI, or USB) or proprietary buses, or any combination thereof. The disk controller 160 can be coupled to one or more disk drives via the disk interface 162. Such disk drives include a hard disk drive (HDD) 164 or an optical disk drive (ODD) 166 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 166 can read a removable data storage medium (e.g., a Compact Disk (CD), a Digital Video Disk (DVD), a mini Digital Video Disk (mini-DVD), or other optical media). Additionally, the information handling system 100 can include a disk emulator 170 that is coupled to the disk interface 162. The disk emulator 170 can permit a solid-state drive 174 to be coupled to the information handling system 100 via an external interface 172. The external interface 172 can include other industry standard busses (e.g., USB or IEEE 1394 (Firewire) or proprietary busses, or any combination thereof. Alternatively, the solid-state drive 174 can be disposed within the information handling system 100.

The information handling system 100 can further include a management controller 180 that can be coupled to the chipset 110 via a system communication bus 182, such as a control bus. The management controller 180 may be on a main circuit board (e.g., a baseboard, a motherboard, or any combination thereof). Although not illustrated, another resource, such as the processors 102 or 104, the memory 120, the graphics interface 130, the video display 134, the I/O interface 140, or the disk controller 160, or any combination thereof, can be coupled to the management controller 180. Commands, communications, or other signals may be sent to or received from the management controller 160 by any one or any combination of resources previously described. The management controller 160 can be part of an integrated circuit or a chip set within the information handling system 100.

Figure 2:
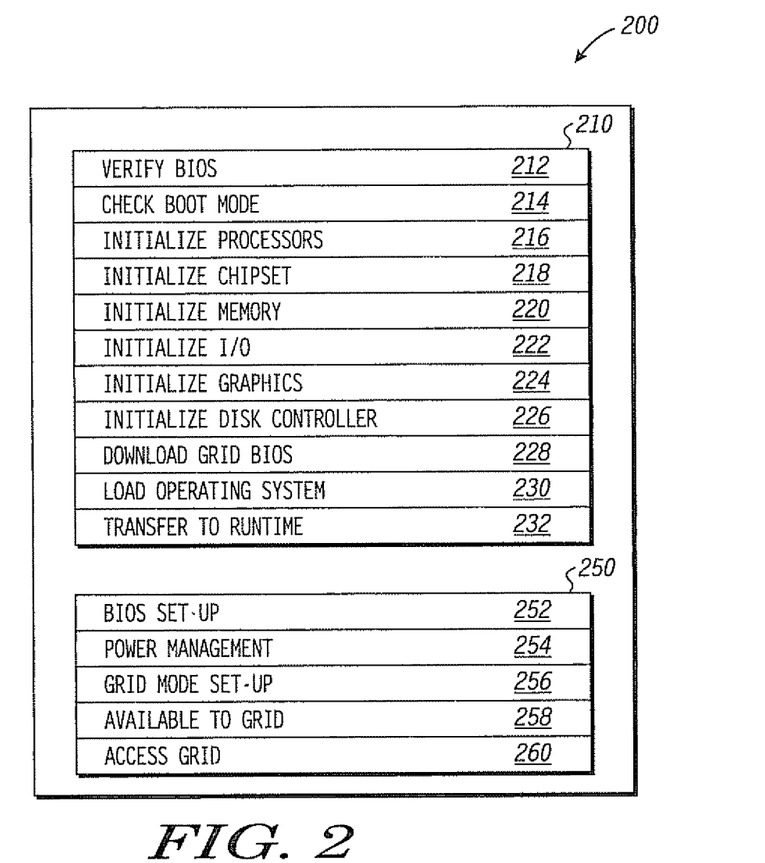
FIG. 2 illustrates an example of BIOS code in an information handling system.

The information handling system 100 can also include a memory module 150 that can be coupled to the I/O bus 112. The memory module 150 can include a persistent memory device such as a FLASH memory, another non-volatile memory device, or a combination thereof. The memory module 150 can include code operable to detect and identify resources within the information handling system 100, provide the appropriate drivers for those resources, to initialize those resources, and access those resources. A non-limiting example of the code can include a basic input/output system (BIOS), extensible firmware interface (EFI), advanced configuration and power interface (ACPI), system management BIOS (SMBIOS), firmware, other suitable code, or any combination thereof. FIG. 2 illustrates a functional block diagram of a non-limiting exemplary embodiment of the code, a BIOS code, generally designated as 200. The BIOS code 200 can include power on self test (POST) code 210, and runtime code 250. The POST code 210 is operable during a boot sequence to identify and initialize some or all of the resources of the information handling system 100.

The POST code 210 can identify and initialize some of the resources of the information handling system by making procedure calls to POST procedures (PP). Non-limiting examples of POST procedures include a verify-BIOS PP 212, a check-boot-mode PP, an initialize-processor PP 216, an initialize-chipset PP 218, an initialize-memory PP 220, an initialize-I/O PP 222, an initialize-graphics PP 224, an initialize-disk-controller PP 226, a download-grid-BIOS PP 228, a load-operating-system PP 230, and a transfer-to-runtime PP 232. The verify-BIOS PP 212 can inspect the BIOS code 200 to ensure that no corruption of the machine operable code contained therein has occurred since the last boot sequence. The check-boot-mode PP 214 determines the reason that the POST code 210 is being executed. Non-limiting examples of reasons to execute the POST code 210 include a cold boot (i.e., after complete power-off and retaining no information regarding the context of the prior power-on state), a warm boot (i.e., a software initiated boot event), a managed state request (i.e., where context information from the prior power-on state is restored), or a grid mode request (as described below). The check-boot-mode PP 214 may be used to determine which of the subsequent POST procedures are executed, based upon the reason that the POST code 210 is being executed.

Other POST procedures can identify and initialize the resources in the information handling system 100. The initialize-processor PP 216 can operate to detect the number, identify the types and initialize the processors 102 through 104, and the host buses 106 through 108. The chipset 110 can be identified and initialized by the initialize-chipset PP 218. The initialize-chipset PP 218 can also function to discover which other resources (e.g., the memory 120, the graphics interface 130, the I/O interface 140, the disk controller 160) are coupled to the chipset 110. This discovery can include initialization of the individual buses (e.g., the I/O bus 112, the memory bus 122, or graphics bus 132) that are coupled to the chipset, or the initialization of the individual busses 112, 122, or 132 can be performed as a part of the POST procedure associated with the coupled resource, or any combination thereof. The initialize-memory PP 220 can determine the size and type of coupled memory, as well as execute a memory read/write test for every memory location in the memory 120. The initialize-I/O-interface PP 222 can identify and initialize the I/O interface 140, and can discover and initialize the I/O channel 142 and other I/O channels (not illustrated), and detect and initialize resources (not illustrated) that are coupled to the I/O channel 142 and other I/O channels. Also, the initialize-graphics PP 224 can identify and initialize the graphics interface 130. The initialize-disk-controller PP 226 can function to identify and initialize the disk controller 160, to initialize the disk interface 162, and to identify and initialize the hard disk drive 164, the optical disk drive 166, and the disk emulator 172.

The function of the download-grid-BIOS PP 228 will be described below. The load-operating-system PP 230 can function to detect the presence of an operating system for the information handling system 100. An operating system can include code operable to provide an environment in which application programs are run on the information handling system 100, and to create a context for running a program where a particular user is associated with a set of resources that may be accessed by the program. The load-operating-system PP 230 can include a prioritized list of locations to search for the operating system. A non-limiting location for where an operating system can be stored includes on the hard disk drive 164, on a removable data storage medium (e.g., a CD, a DVD, a mini-DVD, etc.) that is readable by the optical disk drive 166, on a solid state drive 174, or on a network storage device that is coupled to the I/O channel 142. The load-operating-system PP 230 can search for an operating system in a particular location on the prioritized list. If no operating system is found in the particular location, the load-operating-system PP 230 can search for an operating system in another particular location on the prioritized list, etc., until an operating system is found. If the load-operating-system PP 230 fails to find an operating system, the load-operating-system PP 230 can display an error message on the video display 134, and halt all further operations on the information handling system 100. When an operating system is found, the load-operating-system PP 230 can load and initialize the operating system. When an operating system is loaded and initialized, the transfer-to-runtime PP 232 can transfer the control of the information handling system 100 to the operating system and the runtime code 250.

The POST procedure 212, 214, 216, 218, 220, 222, 224, 226, 228, 230, or 232, or any combination thereof, can include code operable to perform the requested function, or can include code operable to call a sub-routine to perform the requested function, or any combination thereof. A sub-routine can also include code in the memory module 150, or in a memory device in a resource (e.g., option ROM, or firmware) of the information handling system 100, or any combination thereof. Hardware and resource choices made in the design of the information handling system 100 may dictate that certain particular POST procedures 212, 214, 216, 218, 220, 222, 224, 226, 228, 230, or 232 occur before, after, or at substantially the same time as other POST procedures 212, 214, 216, 218, 220, 222, 224, 226, 228, 230, or 232, or that another POST procedure (not illustrated) may be added to initialize a particular hardware or resource. Therefore, after reading this specification, the skilled artisan will recognize that the order of the POST procedures 212, 214, 216, 218, 220, 222, 224, 226, 228, 230, and 232 as presented may or may not reflect the actual order of procedures as actually implemented. Furthermore, it may not be necessary to perform all POST procedures 212, 214, 216, 218, 220, 222, 224, 226, 228, 230, and 232 to successfully boot the information handling system 100, and different boot modes may use different subsets of POST procedures 212, 214, 216, 218, 220, 222, 224, 226, 228, 230, or 232.

The BIOS code 200 can also include runtime code 250 that is operable to create and manage operating parameters of the information handling system 100, and access the resources of the information handling system 100 before, during, or after an operating system is loaded. The runtime code 250 can be used to make procedure calls to runtime procedures (RP). Non-limiting examples of runtime procedures include a BIOS-set-up RP 252, a power-management RP 254, a grid-mode-set-up RP, an available-to-grid RP 258, and an access-grid RP 260. The runtime procedures can be generic to the operation of the information handling system 100. The BIOS-set-up RP 252 can permit a user of the information handling system 100 to set global parameters for the information handling system 100. A non-limiting example of global parameters that can be set by a procedure call to the BIOS-set-up RP 252 include setting day, date and time, setting bus speeds, setting security passwords, creating the prioritized list of locations that the load-operating-system PP 230 searches to load the operating system, another suitable procedure call, or any combination thereof. The power-management RP 254 can control the power levels of the resources of the information handling system 100. As such, the power-management RP 254 can set up various low power modes on the information handling system 100, or switch the power to the information handling system 100 on (i.e., power-on) or off (i.e., power-off). The power-management RP 254 can also include a mechanism to set a wake state such that a wake event, when received, causes the power to the information handling system 100 to switch on. A wake event can include a ring on a phone line (not illustrated) that is coupled to the information handling system 100, a particular event occurring on the I/O channel 142, an alarm on an internal clock (not illustrated) in the information handling system 100, another event, or any combination thereof. The grid-mode-set-up RP 256 and the available-to-grid RP 258 will be described below.

The runtime code 250 can also include runtime procedures that are specific to particular resources that are present on the information handling system 100, and that are created by a particular POST procedure 212, 214, 216, 218, 220, 222, 224, 226, 228, 230, 232, or any combination thereof associated with each particular resource. As an example, when the information handling system 100 includes a hard disk drive 164 of the SATA type, the POST code 210 can recognize the hard disk drive 164, call a SATA PP (not illustrated) operable to initialize the disk interface 162 as a SATA interface, establish a logical location for the hard disk drive 164, and install a SATA RP into the runtime code 250 for reading data from and writing data to the hard disk drive 164. When the operating system or another program determines that data is to be read from or written to the hard disk drive 164, the SATA RP is called to execute the read or write. The access-grid RP 260 is another example of a runtime procedure that can be created as a result of the execution of the POST code 210. The access-grid RP 260 will be described more fully below.

Figure 3:
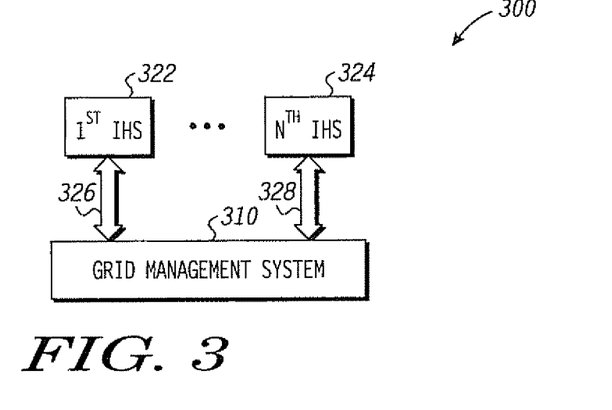
FIG. 3 illustrates a functional block diagram of a grid environment, including information handling systems and a grid management system.

FIG. 3 illustrates a functional block diagram of an exemplary embodiment of a grid environment, generally designated as 300. The grid environment 300 can include a grid management system 310. The grid management system 310 can include an information handling system similar to the information handling system 100, a program of executable code run such information handling system, a distributed network of such information handling systems or a program run thereon, or any combination thereof. The grid environment 300 can include an information handling system 322 that is similar to the information handling system 100, and that is coupled to the grid management system 310 via an I/O channel 326. The grid environment 300 can further include one or more additional information handling system that is similar to the information handling system 100, generally designated as an $n^{th}$ information handling system 324, and that is coupled to the grid management system 310 via an $n^{th}$ I/O channel 328. The information handling systems 322 through 324 can include an information handling system similar to the information handling system 100. The grid environment 300 can include a network of information handling systems such as a local area network (LAN), wide area network (WAN), the Internet, another network structure, or any combination thereof.

The grid management system 310 can function to determine whether or not a particular information handling system 322 or 324 is available to be used by the grid management system 310, and, if available, to allocate tasks to the information handling system 322 or 324. The information handling systems 322 through 324 can be under the control of individuals that differ from the individual that controls the grid management system 310. For this reason, the information handling systems 322 through 324 may only be available to the grid management system 310 for limited amounts of time. Therefore, the grid environment 300 can include a mechanism that permits the passing of an availability status from the information handling systems 322 through 324 to the grid management system 310. The passing of the availability status can be achieved by having the information handling system 322 through 324 push the availability status to the grid management system 310, by having the grid management system 310 pull the status from the information handling systems 322 through 324 for the availability status, or any combination thereof.

In the following descriptions, information handling system 322 is referred to by way of illustration. However, the descriptions as applied to information handling system 322 may apply to any other information handling systems such as information handling system 324. Furthermore, in the following descriptions, references made to a BIOS, POST procedures, and runtime procedures are intended as a non-limiting examples of code that can be included in a memory module that is similar to the code included in the memory module 150. As such, the functions described can be performed in BIOS, EFI, ACPI, SMBIOS, firmware, other suitable code, or any combination thereof. When the user of an information handling system 322 wishes to make the information handling system 322 available to the grid management system 310, the user can initiate a BIOS procedure call to the grid-mode-set-up RP 256 to set up the policies under which the information handling system 322 is to be made available to the grid management system 310. The policies that can be set up with the grid-mode-set-up RP 256 can include making the information handling system 322 available to the grid management system 310, selecting the resources of the information handling system 322 that may be accessed by the grid management system 310, selecting the duration for which the information handling system 322 is to be made available, or any combination thereof. Note that "available" denotes a state of the information handling system 322, and "accessible" refers to a state of a particular resource in the information handling system 322. A non-limiting example of an availability option may include making the information handling system 322 unavailable to the grid management system 310, permitting availability when the information handling system 322 enters a particular power state (e.g., power-off, low power state, hibernation, etc.), permitting availability only at the user's direction, another suitable availability option, or any combination thereof.

A non-limiting example of a resource that can be made accessible may include the graphics interface 130, the disk controller, another resource, or any combination thereof. For example, making the graphics interface 130 accessible could permit the grid management system 310 to display processing results to the user, while restricting access to the graphics interface 130 could conserve power. Likewise, making the disk controller 160 accessible could permit more extensive processing tasks to be performed by the information handling system 322, while restricting access could secure the user's data against accidental or malicious tampering. Other resources in the information handling system 322 could be made accessible to the grid management system 310 to increase the utility of the information handling system 322 to the grid environment 300, while decreasing, for example, the power consumption of the information handling system 322 or the risks to data security to the information handling system 322.

A non-limiting example of the duration for which the information handling system 322 may made available to the grid management system 310 includes permitting availability for a fixed amount of time (e.g., for three hours), at a fixed time of day (e.g., from 7:00 PM until 5:00 AM), until a certain time (e.g., until 3:00 PM), until availability is cancelled (e.g., when the user needs to use the information handling system 322), another suitable duration, or any combination thereof. When the information handling system 322 is available to the grid management system 310, the available-to-grid RP 258 can communicate to the grid management system 310 that the information handling system 322 is available via the I/O channel 326 or 328. Alternatively, the grid management system 310 may inquire if the information handling system 322 is available.

The grid management system 310 can include data that is to be processed. The grid management system 310 can function to allocate different subsets of the data to any one or combination of the information handling systems 322 through 324. The information handling system 322 can then perform processing on the allocated subset of data and return the result of the processing to the grid management system 310. The information handling system 322 can include an application program that causes the information handling system 322 to get data from the grid management system 310, process the data, and return a result to the grid management system 310. In this way, the grid environment 300 flexibly uses accessible resources to process data, without having to invest in clusters of information handling systems.

In an embodiment, the user of an information handling system 322 may initiate a BIOS procedure call to the grid-mode-set-up RP 256 and select the desired availability policies. When the information handling system 322 is to be made available to the grid management system 310 (e.g., because the user desired the information handling system 322 to become immediately available or because the time that the user desired the information handling system 322 to become available to the grid management system 310 has come), the grid-mode-set-up RP 256 can set the information handling system 322 into a grid mode (e.g., by setting a flag in a nonvolatile memory, writing to a register, etc.) The grid-mode-set-up RP 256 can also initiate a BIOS procedure call to the available-to-grid RP 258. The available-to-grid RP 258 can pass the availability status to the grid management system 310 via the I/O channel 326 or 328, and the available-to-grid RP 258 can initiate a BIOS procedure call to the power-management RP 254 which can power-off the information handling system 322.

If the user desires the information handling system 322 to become available upon power-off, and the information handling system 322 is being powered-off, the power-management RP 254 (which can be called to power-off the information handling system 322) can set the information handling system 322 into grid mode and initiate a BIOS procedure call to the available-to-grid RP 258 to pass the grid mode status to the grid management system 310. Then, the power-management RP 254 can power-off the information handling system 322.

When the grid management system 310 learns of the availability of the information handling system 322, the grid management system 310 can send a wake event to the information handling system 322 via the I/O channel 326 or 328. When the information handling system 322 is powered-off and receives a wake event, the information handling system 322 can proceed to execute the POST code 210. The check-boot-mode PP 214 can determine that the information handling system 322 is in grid mode. If the information handling system 322 is not in grid mode, the information handling system 322 can continue to execute the POST code 210 as determined by the check-boot-mode PP 214. On the other hand, if the information handling system 322 is in grid mode, the check-boot-mode PP 214 can verify the availability polices. As such, the check-boot-mode PP 214 can determine if the wake event from the grid management system 310 occurred within a valid timeframe.

For example, when the user desired that the information handling system to be available from 7:00 PM until 7:00 AM, if the wake event occurred at 10:00 PM, then the wake event happened within a valid timeframe. If the wake event occurred at 10:00 AM, the wake event was not within a valid timeframe. If the wake event did not occur within a valid timeframe, then the check-boot-mode PP 214 can power down the information handling system 322. If the wake event did occur within a valid timeframe, then the check-boot-mode PP 214 can check the availability policies with respect to accessible resources.

If all resources are to be accessible in grid mode, then the check-boot-mode PP 214 can determine to call the post procedures for all resources in the information handling system 322. If some resource is not to be made accessible to the grid management system 310, then the check-boot-mode PP 214 can determine not to call the POST procedures associated with the particular resource that is not to be made accessible. For example, if the user does not desire the graphics interface 130 and the disk controller 160 to be accessible in grid mode, then the check-boot-mode PP 214 can determine not to call the initialize-graphics PP 224 and the initialize-disk-controller PP 226.

When the wake event occurs within a valid timeframe, the check-boot-mode PP 214 can also determine that the download-grid-BIOS PP 228 is to be called. The download-grid-BIOS PP 228 can initiate the I/O channel 326 or 328, indicate to the grid management system 310 that the information handling system 322 has successfully booted in grid mode, download the grid-access RP 260 to the runtime code 250, or any combination thereof. The download-grid-BIOS PP 228 can also change the prioritized list of locations where the load-operating-system PP 230 searches for the operating system. The download-grid-BIOS PP 228 can set the grid management system 310 as the top location in the list, so that, when the load-operating-system PP 230 is called, the operating system will be provided by the grid management system 310. The transfer-to-runtime PP 232 can then transfer the control of the information handling system 322 to the operating system and the runtime code 250.

The information handling system 322 can operate under the direction of the operating system provided by the grid management system 310 to process data provided by the grid management system 310. When the information handling system 322 has processed the data, the operating system can make a procedure call to the access-grid RP 260 to communicate the results of the processing to the grid management system 310, and to obtain new data from the grid management system 310 for processing.

When the system availability times out (i.e., the duration policy limit is exceeded), or the user requests that the control of the information handling system 322 be returned to the user, the operating system can clear the information handling system 322 out of grid mode and makes a BIOS call to the available-to-grid RP 258. The available-to-grid RP 258 can pass the grid mode status to the grid management system 310. The grid management system 310 can take appropriate steps to suspend the task currently being performed by the information handling system 322, and release the control of the information handling system 322. The available-to-grid RP 258 can then initiate a BIOS procedure call to the power-management RP 254 which can cycle power to the information handling system 322, whereupon the information handling system 322 boots just as it would if it was not coupled to the grid management system 310.

Figure 4:
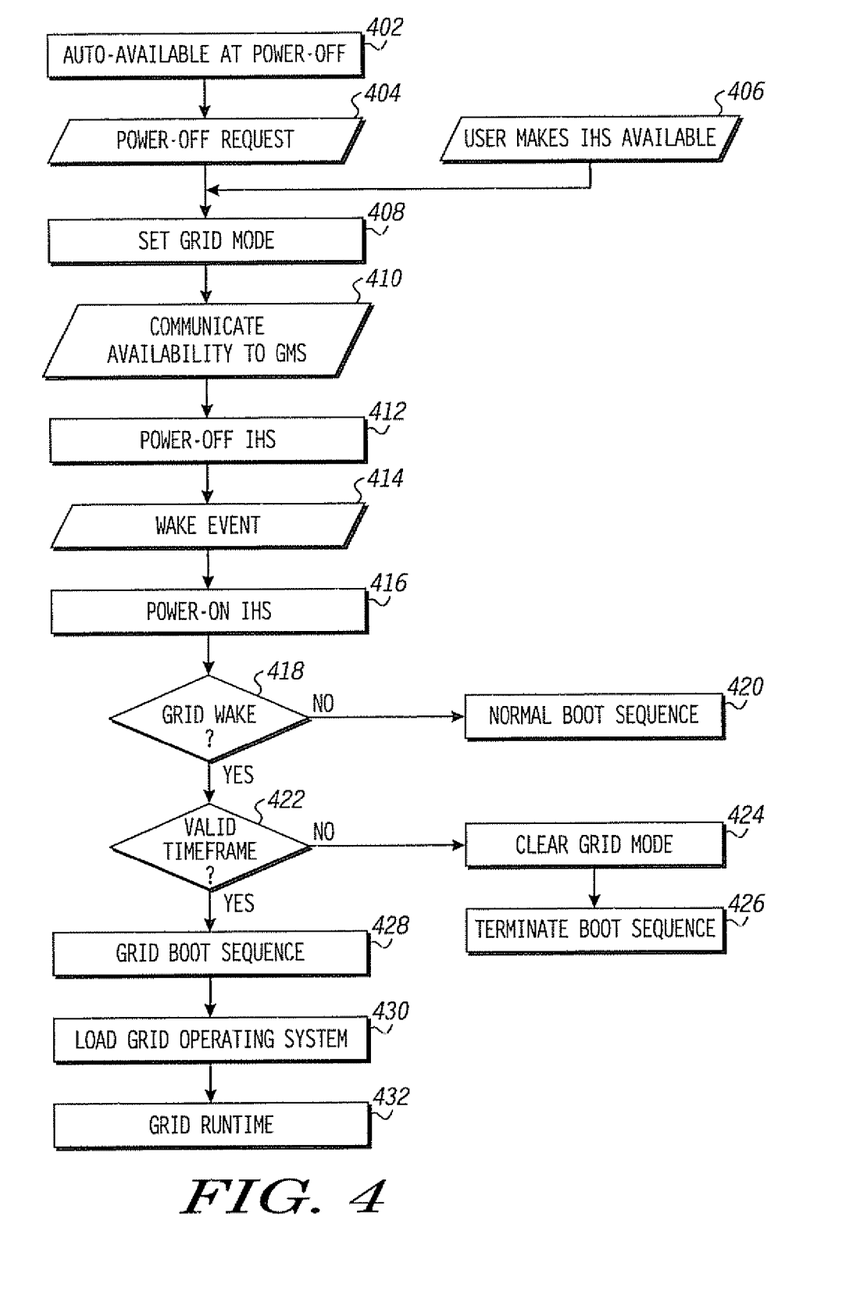
FIG. 4 illustrates a flow diagram of a method of making an information handling system available to a grid management system.

FIG. 4 illustrates an embodiment of a method of using the information handling system 322 in conjunction with the grid management system 310 in a flow chart form. The information handling system 322 can be arranged to become available to a grid management system 310 when the information handling system 322 is powered-off in block 402. A power-off request is received by the information handling system 322 in block 404. In the alternative, a user of the information handling system 322 can make the information handling system 322 available in block 406. As described above, the user can make the information handling system available for a fixed amount of time, at a fixed time of day, until a certain time, until availability is cancelled, or any combination thereof. When a power-off request is received in block 404 or a user makes the information handling system 322 available in block 406, the grid mode is set in block 408. The information handling system 322 communicates its availability to the grid management system 310 in block 410, and then powers-off in block 412. The information handling system 322 receives a wake event in block 414, and the information handling system 322 is powered-on in block 416. A decision is made whether the wake event is from the grid management system 310 in decision tree 418. If not, then the information handling system 310 proceeds with a normal boot sequence in block 420.

If the wake event is from the grid management system 310, the "yes" branch of decision tree 418 is taken and a decision is made whether the wake event occurred within a valid timeframe in decision tree 422. If not, the grid mode is cleared in block 424 and the boot sequence is terminated in block 426. If the wake event occurred with a valid timeframe, the "yes" branch of decision tree 422 is taken and the grid boot sequence is executed in block 428. The grid operating system is loaded in block 430, and execution is passed from the POST code 210 to the runtime code 250 in block 432.

Figure 5:
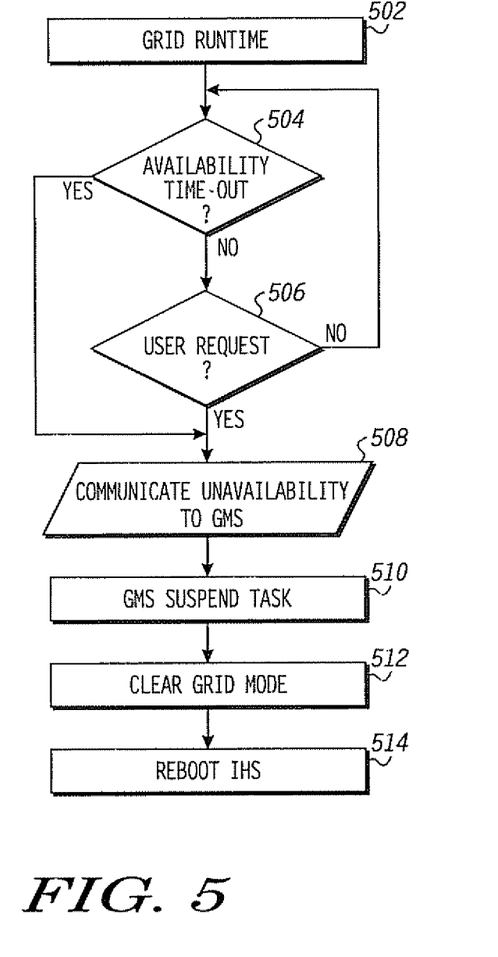
FIG. 5 illustrates a flow diagram of a method of making an information handling system unavailable to a grid management system.

FIG. 5 illustrates an embodiment of a method of terminating use of the information handling system 322 by the grid management system 310 in a flow chart form. The information handling system 322 is operating in grid runtime in block 502. A decision is made whether the availability timeframe has timed-out (i.e., that the duration policy set by the user has been exceeded) in decision tree 504. If not, then a decision is made whether a user request to make the information handling system 322 unavailable has been received in decision tree 506. If not, then processing proceeds at decision tree 504.

If the availability timeframe has timed-out, the "yes" branch of decision tree 502 is taken and the information handling system 322 communicates that its unavailability to the grid management system 310 in block 508. Also, if a user request to make the information handling system 322 unavailable has been received, the "yes" branch of decision tree 504 is taken and the information handling system 322 communicates that its unavailability to the grid management system 310 in block 508. The grid management system 310 suspends the current task being executed by the information handling system 322 in block 510. The grid mode is cleared in block 512, and the information handling system 322 is rebooted in block 514.

Many different aspects and embodiments of the present disclosure are possible. Some of those aspects and embodiments are described below. After reading this specification, skilled artisans will appreciate that those aspects and embodiments are only illustrative, and do not limit the scope of the present invention.

In a first aspect, a method of using an information handling system that includes a first resource can include communicating to a grid management system that the first resource is accessible to the grid management system, powering down the information handling system, receiving a request from the grid management system to power up the information handling system, and in response to receiving the request, booting the information handling system into a grid computing mode, wherein the first resource accessible to the grid management system.

In one embodiment of the first aspect, the method can include communicating to the grid management system that the first resource is not accessible to the grid management system and rebooting the information handling system. In another embodiment of the first aspect, the method can further include operating a user interface before communicating to the grid management system that the first resource is accessible, and in response to receiving information from the user interface, setting the first resource as being accessible to the grid management system. Further, the user interface can be operable to set the first resource as being accessible for a particular time period or until the information handling system receives an indication that the first resource is no longer accessible.

In a further embodiment of the first aspect, the method can include setting the first resource as being accessible to the grid management system when powering down the information handling system. In another embodiment of the first aspect, the method can further include receiving machine executable code from the grid management system, and executing the machine executable code. In yet a further embodiment of the first aspect, the information handling system can include a second resource that is not accessible to the grid management system, and booting of the information handling system into the grid computing mode can further include restricting the grid management system from accessing the second resource. In another embodiment, the second resource can include a storage device.

In a second aspect, machine-executable code for an information handling system with a first resource can be embedded within a tangible medium that can include instructions for carrying out a method. The method can include indicating that the first resource in the information handling system is accessible to a grid management system, communicating to the grid management system that the first resource is accessible, and placing the information handling system into a low power state.

In an embodiment of the second aspect, the method can further include detecting a wake request, responsive to detecting the wake request, determining whether the wake request was received from the grid management system, when the wake request was received from the grid management system, determining whether the first resource is accessible, and when the first resource is accessible, executing a boot code in the information handling system that enables the first resource to be accessed by the grid management system. In another embodiment, the method can include receiving machine executable code from the grid management system, and executing the machine executable code. In a further embodiment, the information handling system further include a second resource that is not accessible to the grid management system, and executing the boot code includes restricting the grid management system from accessing the second resource. In yet another embodiment, the second resource can include a storage device.

In another embodiment of the second aspect, the method can further include, before indicating that the first resource is accessible, operating a user interface, and in response to receiving information via the user interface, setting a state such that the first resource becomes accessible. In further embodiments, the user interface can be operable to indicate that the first resource is accessible for a particular time period, or that the first resource is not accessible. In another embodiment of the second aspect, placing the information handling system into the low power state can include indicating that the first resource is accessible.

In a third aspect, an information handling system can include a resource, and a processor that can be operable to indicate that the resource in the information handling system is accessible to a grid management system, communicate to the grid management system that the resource is accessible, and place the information handling system into a low power state. In an embodiment of the third aspect, the processor can be further operable to detect a wake request, determine whether the wake request originated from the grid management system, determine whether the resource is accessible when the wake request originated from the grid management system, and execute a boot code in the information handling system that enables the resource when the resource is accessible.

Note that not all of the activities described above in the general description or the examples are required, that a portion of a specific activity may not be required, and that one or more further activities may be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features described herein in the context of separate embodiments for the sake of clarity, may also be provided in combination in a single embodiment. Conversely, various features that are, for brevity, described in the context of a single embodiment, may also be provided separately, or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of using an information handling system including a first resource and a basic input/output system (BIOS), the method comprising:
   communicating to a grid management system that the first resource is accessible to the grid management system, wherein the communicating is via an available-to-grid runtime procedure of the BIOS;
   powering down the information handling system;
   receiving a request from the grid management system to power up the information handling system; and
   in response to receiving the request:
      booting the information handling system into a grid computing mode; and
      downloading a grid operating system from the grid management system, wherein the first resource is accessible to the grid operating system, wherein the downloading is via a download-grid-BIOS post procedure of the BIOS.

2. The method of claim 1, further comprising:
   communicating to the grid management system that the first resource is not accessible to the grid management system, wherein the communicating is via the available-to-grid runtime procedure; and
   rebooting the information handling system.

3. The method of claim 1, further comprising:
   before communicating to the grid management system that the first resource is accessible, operating a user interface, wherein the user interface is operated via a grid-mode-set-up runtime procedure of the BIOS; and
   in response to receiving information from the user interface, setting the first resource as being accessible to the grid management system.

4. The method of claim 3, wherein the user interface is operable to set the first resource as being accessible for a particular time period.

5. The method of claim 3, wherein the user interface is operable to set the first resource as being accessible until the information handling system receives an indication that the first resource is no longer accessible.

6. The method of claim 1, further comprising, when powering down the information handling system, setting the first resource as being accessible to the grid management system.

7. The method of claim 1, further comprising:
   receiving machine executable code from the grid management system, wherein the receiving is via the download-grid-BIOS post procedure; and
   executing the machine executable code on the grid operating system.

8. The method of claim 1, wherein:
   the information handling system further comprises a second resource that is not accessible to the grid management system; and
   booting of the information handling system into the grid computing mode further comprises restricting the grid management system from accessing the second resource.

9. The method of claim 8, wherein the second resource includes a storage device.

10. Machine-executable code for an information handling system comprising a first resource and a basic input/output system (BIOS), wherein the machine-executable code is embedded within a non-transitory medium and includes instructions for carrying out a method comprising:
   indicating that the first resource in the information handling system is accessible to a grid operating system, wherein the indicating is via an available-to-grid runtime procedure of the BIOS;
   communicating to a grid management system that the first resource is accessible, wherein the communicating is via the available-to-grid runtime procedure;
   placing the information handling system into a low power state;
   receiving a wake request from the grid management system;
   executing a boot code that enables the first resource to be accessed by the grid operating system; and
   downloading the grid operating system from the grid management system, wherein the downloading is via a download-grid-BIOS post procedure of the BIOS.

11. The machine executable code of claim 10, wherein the method further comprises:
  receiving machine executable code from the grid management system; and
  executing the machine executable code on the grid operating system.

12. The machine-executable code of claim 10, wherein:
  the information handling system further comprises a second resource that is not accessible to the grid management system; and
  executing the boot code includes restricting the grid management system from accessing the second resource.

13. The machine-executable code of claim 12, wherein the second resource includes a storage device.

14. The machine executable code of claim 10, wherein the method further comprises:
  before indicating that the first resource is accessible, operating a user interface; and
  in response to receiving information via the user interface, setting a state such that the first resource becomes accessible.

15. The machine executable code of claim 14, wherein the user interface is operable to indicate that the first resource is accessible for a particular time period.

16. The machine executable code of claim 14, wherein the user interface is operable to indicate that the first resource is not accessible.

17. The machine executable code of claim 10, wherein placing the information handling system into the low power state includes indicating that the first resource is accessible.

18. An information handling system comprising:
  a basic input/output system (BIOS);
  a first resource; and
  a processor operable to:
    indicate that the first resource is accessible to a grid management system, wherein the indicating is via an available-to-grid runtime procedure of the BIOS;
    communicate to the grid management system that the first resource is accessible, wherein the communicating is via the available-to-grid runtime procedure;
    place the information handling system into a low power state;
    receive a wake request from the grid management system;
    execute a boot code that enables the first resource to be accessed by a grid operating system; and
    download the grid operating system from the grid management system, wherein the downloading is via a download-grid-BIOS post procedure of the BIOS.

19. The information handling of claim 18, further comprising:
  a second resource;
  wherein the processor is further operable to:
    indicate that the second resource is not accessible to the grid management system; and
    restrict the grid management system from accessing the second resource.

20. The information handling of claim 18, wherein the processor is further operable to:
  run a user interface before indicating that the first resource is accessible; and
  set a state such that the first resource becomes accessible in response to receiving information via the user interface.

* * * * *